(12) United States Patent
Koch et al.

(10) Patent No.: US 7,313,641 B2
(45) Date of Patent: Dec. 25, 2007

(54) INTER-PROCESSOR COMMUNICATION SYSTEM FOR COMMUNICATION BETWEEN PROCESSORS

(75) Inventors: Stefan Koch, Zurich (CH); Hans-Joachim Gelke, Zürich (CH); Axel Hertwig, Nürnberg (DE)

(73) Assignee: NXP B.V., Eindhoven (NL)

( * ) Notice: Subject to any disclaimer, the term of this patent is extended or adjusted under 35 U.S.C. 154(b) by 800 days.

(21) Appl. No.: 09/947,104

(22) Filed: Sep. 5, 2001

(65) Prior Publication Data

US 2002/0055979 A1 May 9, 2002

(30) Foreign Application Priority Data

Sep. 6, 2000 (EP) .................................. 00119255

(51) Int. Cl.
*G06F 13/38* (2006.01)
*G06F 13/28* (2006.01)
(52) U.S. Cl. .................. 710/308; 710/27; 710/305
(58) Field of Classification Search ............. 710/22, 710/27, 36, 37, 305, 306, 308
See application file for complete search history.

(56) References Cited

U.S. PATENT DOCUMENTS 4,866,597 A  9/1989  Kinoshita ................. 364/200
5,093,780 A * 3/1992  Sunahara ................... 709/213
5,283,903 A  2/1994  Uehara ....................... 395/725
5,289,588 A  2/1994  Song et al. ................ 395/425
5,890,013 A * 3/1999  Nair et al. .................. 710/53

FOREIGN PATENT DOCUMENTS

EP   0580961 A1   2/1994
WO   9301553 A1   1/1993

* cited by examiner

*Primary Examiner*—Ilwoo Park (57) ABSTRACT

A system (15) comprising at least two integrated processors (P1 and P2). These two processors (P1 and P2) are operably connected via a communication channel (17) for exchanging information. One processor (P1) has a processor bus (10), a shareable unit (13), and a DMA unit (11) with an external DMA channel (12). The DMA unit (11) and the sharable unit (13) are connected to the processor bus (10). The other processor (P2) has an access unit (21) which is a connectable to the external DMA channel (12) of the DMA unit (11). Due to this arrangement, a communication channel (17) can be established from the access unit (21) which is connectable to the external DMA channel (12), the DMA unit (11), and the processor bus (10).

20 Claims, 7 Drawing Sheets

INTER-PROCESSOR COMMUNICATION SYSTEM FOR COMMUNICATION BETWEEN PROCESSORS

FIELD OF THE INVENTION

The present invention relates in general to the communication between two or more processors. The invention notably concerns inter-processor communication between processors that are arranged on the same semiconductor die.

BACKGROUND OF THE INVENTION

As the demand for more powerful computing devices increases, more and more systems are offered that comprise more than just one processor.

For the purposes of the present invention, a distinction is to be made between computer systems that comprise two or more discrete processors and system where two or more processors are integrated on the same chip. A computer with a main central processing unit (CPU) on a mother board and an algorithmic processor on a graphics card is an example for a computer system with two discrete processors. Another example of a computer system with several discrete processors is a parallel computer where an array of processors is arranged such that an improved performance is achieved. For the sake of simplicity, systems on a board with two or more discrete processors are also considered to belong to the same category.

There are systems where two or more processors are integrated on the same chip or semiconductor die. A typical example is a SmartCard (also referred to as integrated circuit card) that has a main processor and a crypto-processor on the same semiconductor die.

As small handheld devices are becoming more and more popular, the demand for powerful and flexible chips is increasing. A typical example is the cellular phone which in the beginning of its dissemination was just a telephone for voice transmission (analog communication). Over the years additional features have been added and most of today's cellular phones are designed for voice and data services. Additional differentiators are wireless application protocol (WAP) support, paging and short message system (SMS) functionality, just to name some of the more recent developments. All these features require more powerful processors and quite often even dual-processor or multi-processor chips.

In the future, systems handling digital video streams for example will become available. These systems also require powerful and flexible chip sets.

Other examples are integrated circuit cards, such as multi-purpose JavaCards, small handheld devices, such as palm top computers or personal digital assistants (PDAs), and so forth.

It is essential for such dual-processor or multi-processor chips that there exists a communication channel for efficient inter-processor communication. The expression "inter-processor communication" is herein used as a synonym for any communication between a first processor and/or system resources associated with this first processor and a second processor and/or system resources associated with this second processor. A shared memory is an example of a system resource that needs to be accessible by all processors of a chip.

System resources have to be shared in an efficient manner in dual-processor or multi-processor chips where the processors operate in parallel on the same aspect of a task or on different aspects of the same task. The sharing of resources may also be necessary in applications where processors are called upon to process related data.

An example of a multi-processor system is given in the European Patent application EP 0580961-A1, filed on Apr. 16, 1993. The cited Patent application concerns a system with multiple discrete processors and a global bus that is shared by all these processors. Enhanced processor interfaces are provided for linking the processors to the common bus. Such multi-processor systems are not possible for RISC processors, due to the high bus load which would have an impact on the system's performance. The multi-processor system presented in EP 0 580 961-A1 is powerful but complicated and expensive to implement. The shown structure cannot be used in multi-processor systems on a common die.

Another system is proposed in U.S. Pat. No. 4,866,597, filed on Apr. 26, 1985. This US Patent concerns a multi-processor system where each processor has its own processor bus. Data are exchanged between these processors via first-in-first-out data buffers (FIFO) which directly interconnect the respective processor buses. It is a disadvantage of this approach that the size of the buffers increases dramatically with the amount of data to be transferred.

A multi-processor system with a shared memory is described and claimed in U.S. Pat. No. 5,283,903, filed on Sep. 17, 1991. The system in accordance with this US Patent comprises a plurality of processors, a shared memory (main memory), and a priority selector unit. The priority selector unit arbitrates between those processors the request access to the shared memory. This is necessary, since the shared memory is a single-port memory (e.g., a random access memory) that cannot handle simultaneous and competing requests from several processors. It is a disadvantage of this approach that the shared memory is expensive as only intermediate storage. The shared memory may become large with high data transfer.

Another multi-processor system is described in U.S. Pat. No. 5,289,588, filed on Apr. 24, 1990. The processors are coupled by a common bus. They can access a shared memory via this common bus. A cache is associated with each processor and an arbitration scheme is employed to control the access to the shared memory. It is a disadvantage of this approach that the cache memory is expensive as only big caches give a real performance boost. In addition, bus conflicts lead to a reduced performance of each processor.

A microprocessor architecture is described in the PCT Patent application PCT/JP92/00869, filed on Jul. 7, 1992, and published under PCT Publication number WO 93/01553. The architecture supports multiple heterogeneous processors which are coupled by data, address, and control signal buses. Access to a memory is controlled by arbitration circuits.

Some of the known multi-processor systems use architectures where the inter-processor communication occupies part of the processor's processing cycles. It is desirable to avoid this overhead and to free-up the processor's processing power in order to be able to exploit the processor's capabilities and performance.

Other known schemes cannot be used for integrated multi-processor systems where two or more processors are located within the same chip.

It is yet another disadvantage of some known systems that they are asymmetric in their implementation which means that different implementations are required for each processor. Furthermore, the effort for formal verification is greater for asymmetric than for symmetric implementations.

SUMMARY OF THE INVENTION

It is an object of the present invention to provide a scheme for communication between two or more processors and/or their associated components.

It is an object of the present invention to provide an inter-processor communication scheme that is suited for the integration into a semiconductor die.

These and other objectives are achieved by the present invention which provides a system that comprises at least two integrated processors. According to the present invention, these two processors are operably connected via a communication channel for exchanging information. One processor (P1) has a processor bus, a shareable unit, and a DMA unit with an external DMA channel. The DMA unit and the shareable unit are connected to the processor bus. The other processor has an access unit which is connectable to the external DMA channel of the DMA unit. Due to this arrangement, a communication channel is establishable from the access unit to the shareable unit via the external DMA channel, the DMA unit, and the processor bus.

The two processors can be arranged on a common semiconductor die. This allows realization of computing devices such as PDAs, handheld computers, palm top computers, cellular phones, and cordless phones.

The communication channel can be used advantageously for communication between two or more processors and/or their associated components. The inventive arrangement suits general multi-core communication needs. The arrangement is highly symmetrical and it allows the number of otherwise needed bus masters to be minimized for each processor. The present scheme is expandable and very flexible.

These and other aspects of the invention will be apparent from and elucidated with reference to the embodiment(s) described hereinafter.

BRIEF DESCRIPTION OF THE DRAWINGS

For a more complete description of the present invention and for further objects and advantages thereof, reference is made to the following description, given in conjunction with the accompanying drawings, in which.

The present invention is described in connection with several embodiments.

Figure 1:
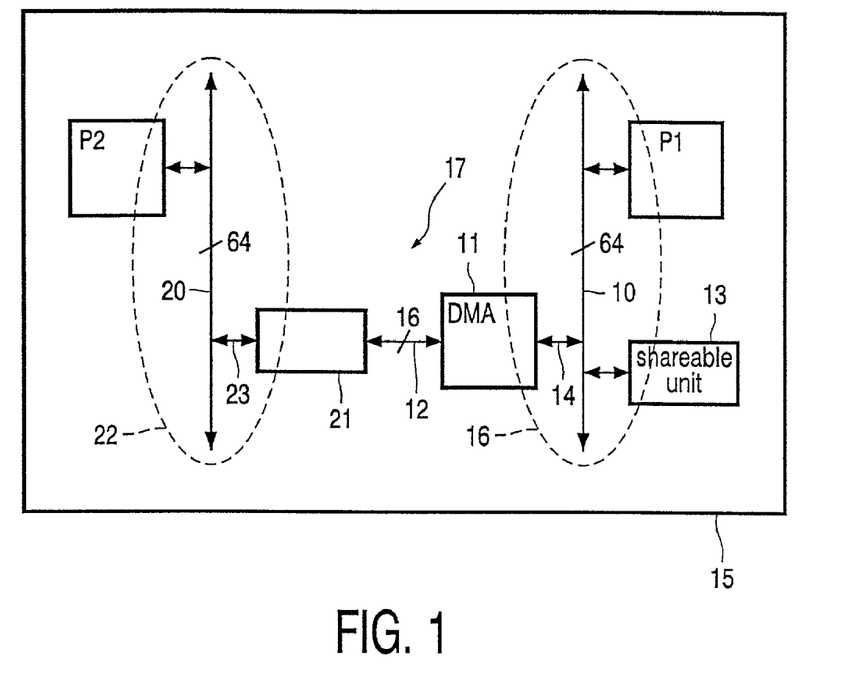
FIG. 1 is a block diagram of a first embodiment of a dual-processor computer system, according to the present invention.

As shown in FIG. 1, a dual-processor system 15 whereto the present invention is applied comprises a first processor P1 that is connected via a processor bus 10 to a shareable unit 13. A processor bus (also called microprocessor bus) is the main path connecting to the computer system's processor. An example of a shareable unit 13 is a shared memory (e.g., a random access memory; RAM). The first processor bus 10 is a 64 bit, 20 MHz bus. The system 15 comprises a second processor P2 that also has a processor bus 20. This second processor bus 20 is a 64 bit, 66 MHz bus. An interconnection between the two processor environments 16 and 22 (schematically illustrated by circles in FIG. 1) is established via a direct memory access (DMA) unit 11. A conventional or a special purpose DMA design can be used. The DMA unit 11 is connected via its internal interface 14 to the processor bus 10 and via its external interface 12 to an access unit 21. The external interface 12 is 16 bits wide. The access unit 21 itself is linked to the processor bus 20 of the second processor P2. A communication channel for exchanging information can be established between the unit 21 and the shareable unit 13, that is, devices within the processor environment 22 and/or the unit 21 can access the shareable unit 13 without having to go through the processor P1 and despite the fact that the shareable unit 13 is associated with the first processor P1. The processors P1 and P2 are integrated on a common semiconductor die (not shown in FIG. 1), and so are the other units.

Figure 2:
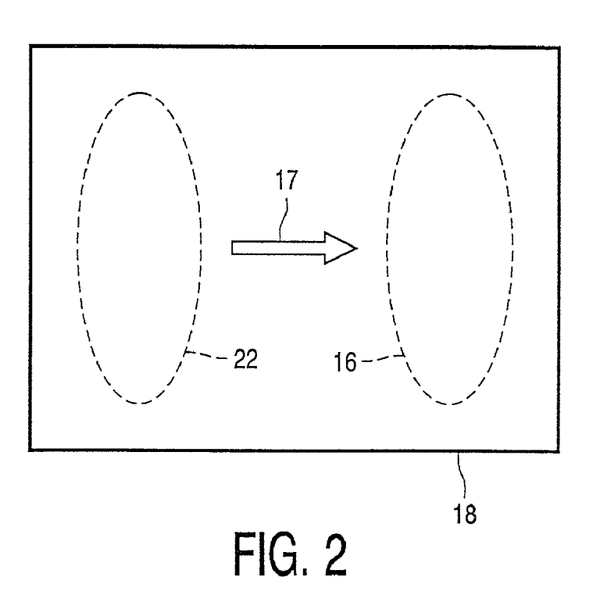
FIG. 2 is a schematic illustration of the inter-processor communication channel established in the dual-processor computer system of FIG. 1.

FIG. 2 is a schematic representation of the common semiconductor die 18 with the two processor environments 16 and 22. There is a communication channel 17 for inter-processor communication that is established in accordance with the present invention.

This dual-processor arrangement 15 allows the second processor P2 to access the shareable unit 13. In more general terms, one processor (processor P2 in the present embodiment) of a multi-processor system in accordance with the present invention can access resources (the shareable unit 13 in the present embodiment) that are associated with another processor (processor P1 in the present embodiment).

Various types of processors can be interconnected using the present scheme. It allows chips to be realized with multiple homogeneous processors or even with multiple heterogeneous processors. The word processor is herein used as a synonym for any processing unit that can be integrated into a semiconductor chip and that actually executes instructions and works with data.

Complex instruction set computing (CISC) is one of the two main types of processor design in use today. It is slowly losing popularity to reduced instruction set computing (RISC) designs. The most popular current CISC processor is the x86, but there are also 68xx, 65xx, and Z80s in use.

Currently, the fastest processors are RISC-based. There are several popular RISC processors, including Alphas (developed by Digital and currently produced by Digital/Compaq and Samsung), ARMs (developed by Advanced RISC Machines, currently owned by Intel, and currently produced by both the above and Digital/Compaq), PA-RISCs (developed by Hewlett-Packard), PowerPCs (developed in a collaborative effort between IBM, Apple, and Motorola), and SPARCs (developed by Sun; the SPARC design is currently produced by many different companies).

ARMs are different from most other processors in that they were not designed to maximize performance but rather to maximize performance per power consumed. Thus ARMs find most of their use in hand-held machines and PDAs.

In the above sections some examples of the processors were given that can be interconnected in accordance with the present invention. Also suited are R.E.A.L. processors, the processor cores of any of the known processors, and customer specific processor designs. In other words, the present concept is applicable to most microprocessor architectures. One can even interconnect a processor with a slow processor bus and a processor with a fast processor bus, as illustrated in connection with the embodiment of FIG. 1.

For the purpose of the present application, the following are also considered to be a processor: central processing unit (CPU), microprocessor, digital signal processor (DSP), system controller (SC), co-processor, auxiliary processor, and so forth. A direct memory access (DMA) unit is a unit that is designed for passing data from a memory to another device without passing it through the processor. A DMA typically has one or more dedicated internal DMA channels and one or more dedicated external DMA channels for external peripherals. For instance, a DMA allows devices on a processor bus to access memory without requiring intervention by the processor.

Examples of shareable units are: volatile memory, non-volatile memory, peripherals, interfaces, input devices, output devices, and so forth.

Figure 3:
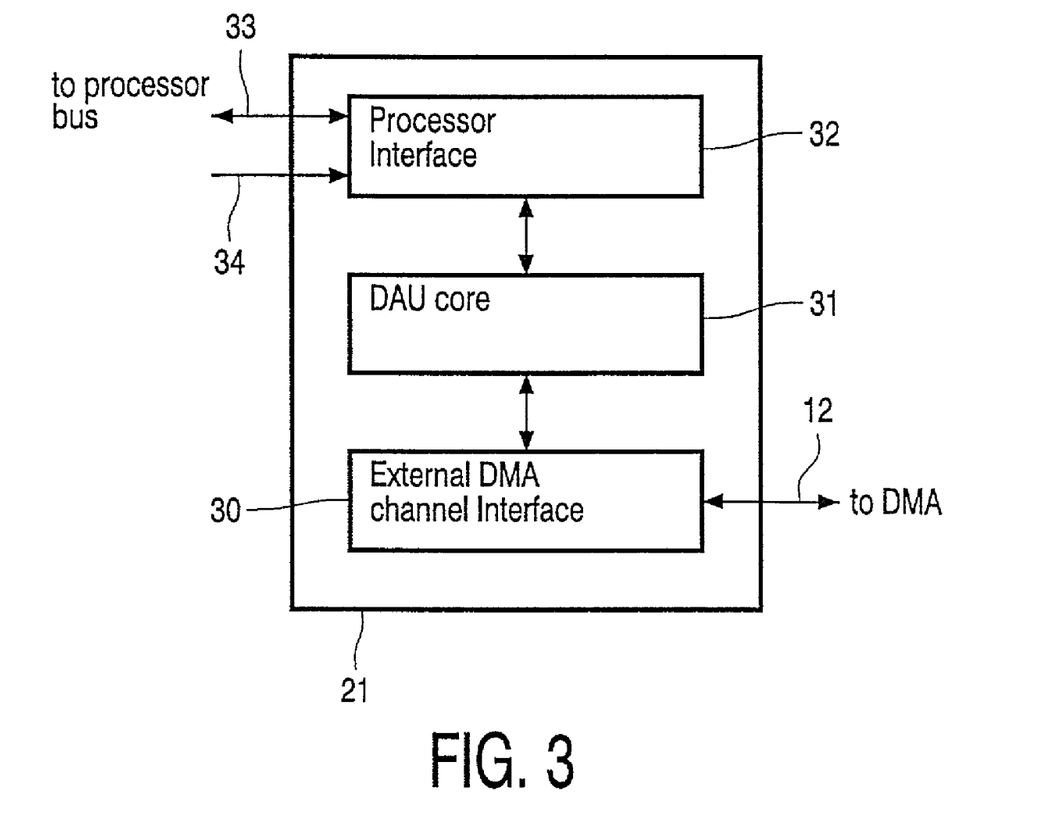
FIG. 3 is a block diagram of an access unit as used in connection with the first embodiment of the present invention.

An implementation example of the access unit 21 is illustrated in FIG. 3. The unit 21 comprises a processor interface 32, a direct access unit (DAU) 31, and an external DMA channel interface 30. The processor interface 32 has a data link 33 and a control link 34 for connection to the processor bus 20. The external DMA channel interface 30 has an output that connects to the external DMA channel 12 of the DMA unit 11. The access unit 21 provides a half-duplex channel between the processor bus 20 and the DMA unit 11. The access unit 21 makes use of the external DMA channel 12 in order to transfer information (data and/or control information) to and from the shareable unit 13. Such an external DMA channel—contrary to an internal DMA channel that is controlled by the processor to which it is associated—is set-up by external agents in order for the remote processor P2 to gain access to the shareable unit 13.

The access unit 21 decouples the data flow between the clock domain of the first processor P1 and the clock domain of the second processor P2. This means that an access to the registers of the access unit 21 can always be done in one cycle independently of how long it takes to actually transfer the data to the external channel 12 of the DMA 11. During the time the transfer takes place at the right hand side in FIG. 1, the left hand side may be stalled or not, depending on the implementation. This means that the processor 2 may continue operation with little impact on its performance.

An access unit 21, according to the present invention, can be programmed by one core only.

The external DMA channel interface 30 and/or the DAU core 31 can be standardized. In other words, each access unit, according to the present invention, may contain an identical functional core. Only the processor interface 32 has to be adapted depending on the actual processor and/or processor bus employed. This leads to a reduced development time due to the maximizing of re-use and reduced verification effort.

As illustrated in FIG. 3, the access unit 21 comprises two distinct units, that is, the external DMA channel interface 30 and the DAU core 31. This is advantageous, since optimum data synchronization can be ensured with such a design. It is also possible, however, to combine the DMA channel interface 30 and the DAU core 31 into one unit.

Figure 4:
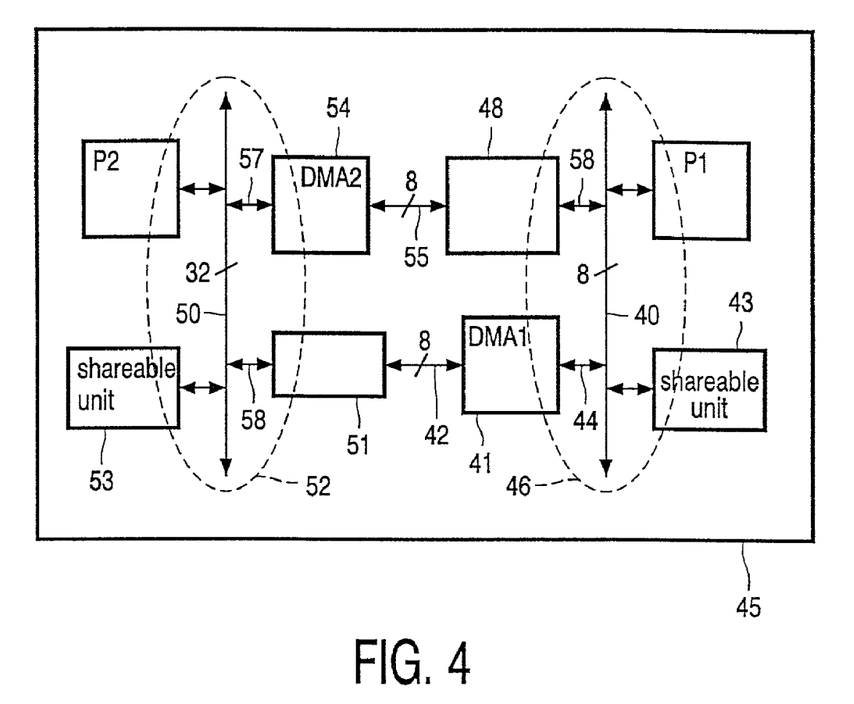
FIG. 4 is a schematic block diagram of a second embodiment of a dual-processor computer system according to the present invention.

Another embodiment of a dual-processor system 45 is illustrated in FIG. 4. This arrangement is called a symmetric tandem. This system 45 comprises a first processor P1 that is connected via a processor bus 40 to a shareable unit 43. The first processor bus 40 is a 8 bit, 150 MHz bus. The system 45 comprises a second processor P2 that also has a processor bus 50. This second processor bus 50 is a 32 bit, 66 MHz bus, i.e., the bus 40 is faster than the bus 50. An interconnection from the first processor environment 46 to the second processor environment 52 (schematically illustrated by circles in FIG. 4) is established via an access unit 48 and a DMA 54 and an interconnection from the second processor environment 52 to the first processor environment 46 is established via an access unit 51 and a DMA 41.

The DMA unit 41 is connected via its internal interface 44 to the processor bus 40 and via its external interface 42 to the access unit 51. The external interface 42 is 8 bits wide. The access unit 51 itself is linked to the processor bus 50 of the second processor P2. A communication channel for transferring information can be established between the unit 51 and the shareable unit 43, that is, devices within the processor environment 52 and/or the unit 51 can access the shareable unit 43 without having to go through the processor P1 and despite the fact that the shareable unit 43 is associated with the first processor environment 46. The second processor environment 52 also comprises a shareable unit 53 that can be accessed from within the first processor environment 46.

The DMA unit 54 is connected via its internal interface 57 to the processor bus 50 and via its external interface 55 to the access unit 48. The external interface 55 is 8 bits wide. The access unit 48 itself is linked to the processor bus 40 of the first processor P1. A communication channel for transferring information can be established between the unit 48 and some resource within the processor environment 52. That is the resources within the processor environment 46 and/or the unit 48 can access some resource within the processor environment 52 without having to go through the processor P2. This means that, there is no need to contact the first processor P2 for accessing resources within this processor's environment 52.

Figure 5:
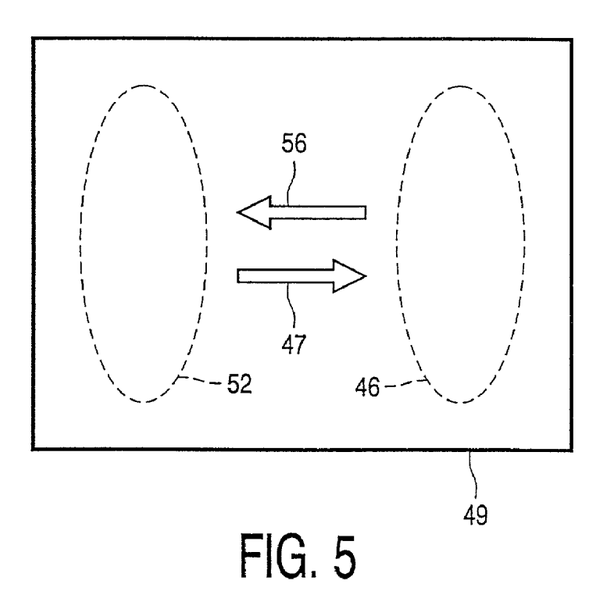
FIG. 5 is a schematic illustration of the inter-processor communication channels established in the a dual-processor computer system of FIG. 4.

A schematic representation of the common semiconductor die 49 with the two processor environments 46 and 52 is given in FIG. 5. There is a communication channel 47 for inter-processor communication, that is established from the processor environment 52 to the processor environment 46 and a communication channel 56 that is established from the processor environment 46 to the processor environment 52.

This symmetric dual-processor arrangement 45 allows the second processor P2 to access the shareable unit 43 and allows the processor P1 to access resources within the processor environment 52.

Figure 6:
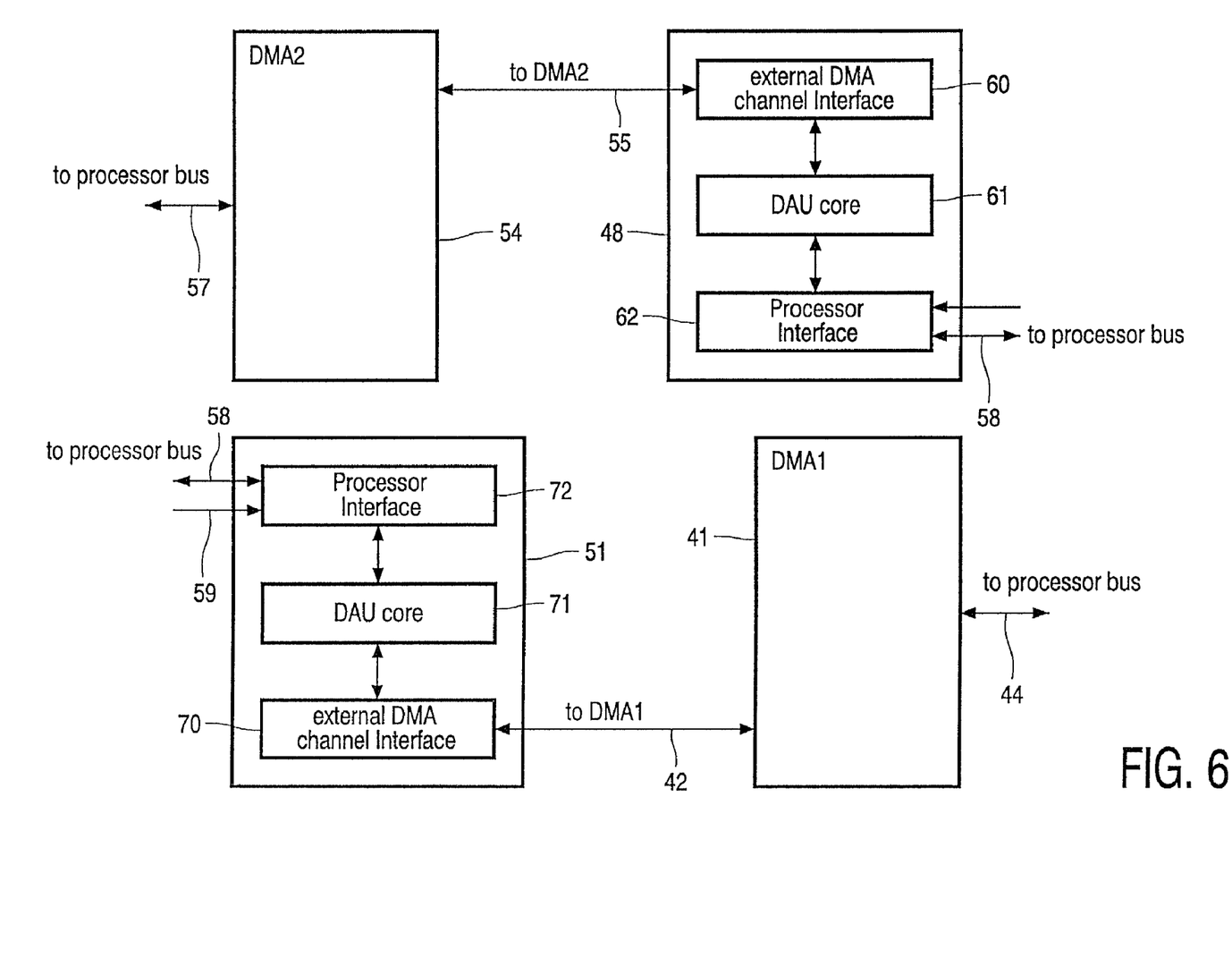
FIG. 6 is a block diagram of the access units and DMA units as used in connection with the second embodiment of the present invention.

An implementation example of the DMA unit 41 and the access unit 51 is illustrated in the bottom half of FIG. 6. The DMA unit 54 and the access unit 48 are illustrated in the upper half of FIG. 6. The units 51 and 48 are identical to the unit 21 in FIG. 3. The only parts that need to be modified are the Processor Interfaces 62 and 72. The direct access unit cores (DAU cores) 61 and 71 and the external DMA channel interfaces 60 and 70 are the same. The processor interface 72 has a data link 58 and a control link 59 for connection to the processor bus 50. The external DMA channel interface 70 has an output that connects to the external DMA channel 42 of the DMA unit 41. The access unit 51 provides a half duplex channel to and from the processor bus 50 and the DMA unit 41. The access unit 51 makes use of the external DMA channel 42 in order to transfer information (data and/or control information) to the shareable unit 43. The external DMA channel interface 60 has an output that connects to the external DMA channel 55 of the DMA unit 54. The access unit 48 provides a half duplex channel to and from the processor bus 40 and the DMA unit 54. The access unit 48 makes use of the external DMA channel 55 in order to transfer information (data and/or control information) to the processor environment 52.

Figure 7:
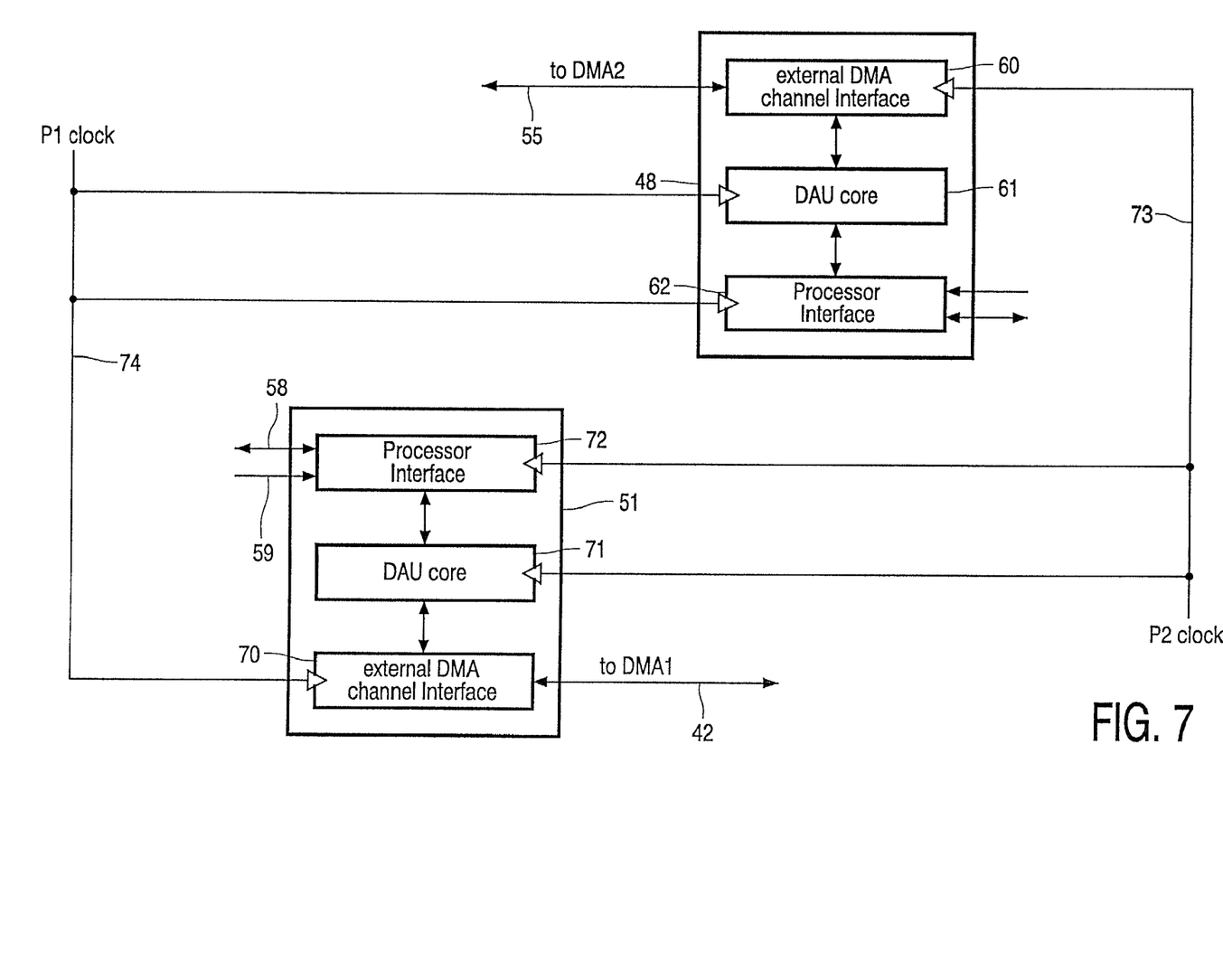
FIG. 7 is a block diagram of the access units as used in connection with the second embodiment of the present invention.

The access units 51 and 48 decouple the data flow between the clock domain of the first processor P1 and the clock domain of the second processor P2, as schematically illustrated in FIG. 7. The clock signal of the first processor P1 (P1 clock) is fed via a clock line 74 to the DAU core 61 and the processor interface 62 of the access unit 48. The clock signal of the second processor P2 (P2 clock) is fed via a clock line 73 to the DAU core 71 and the processor interface 72 of the access unit 51. The access to the registers of the access unit 51 or 48 can be carried out in one processor clock cycle independently of how long it takes to actually transfer the data to the external channel 42 or 55.

Figure 8:
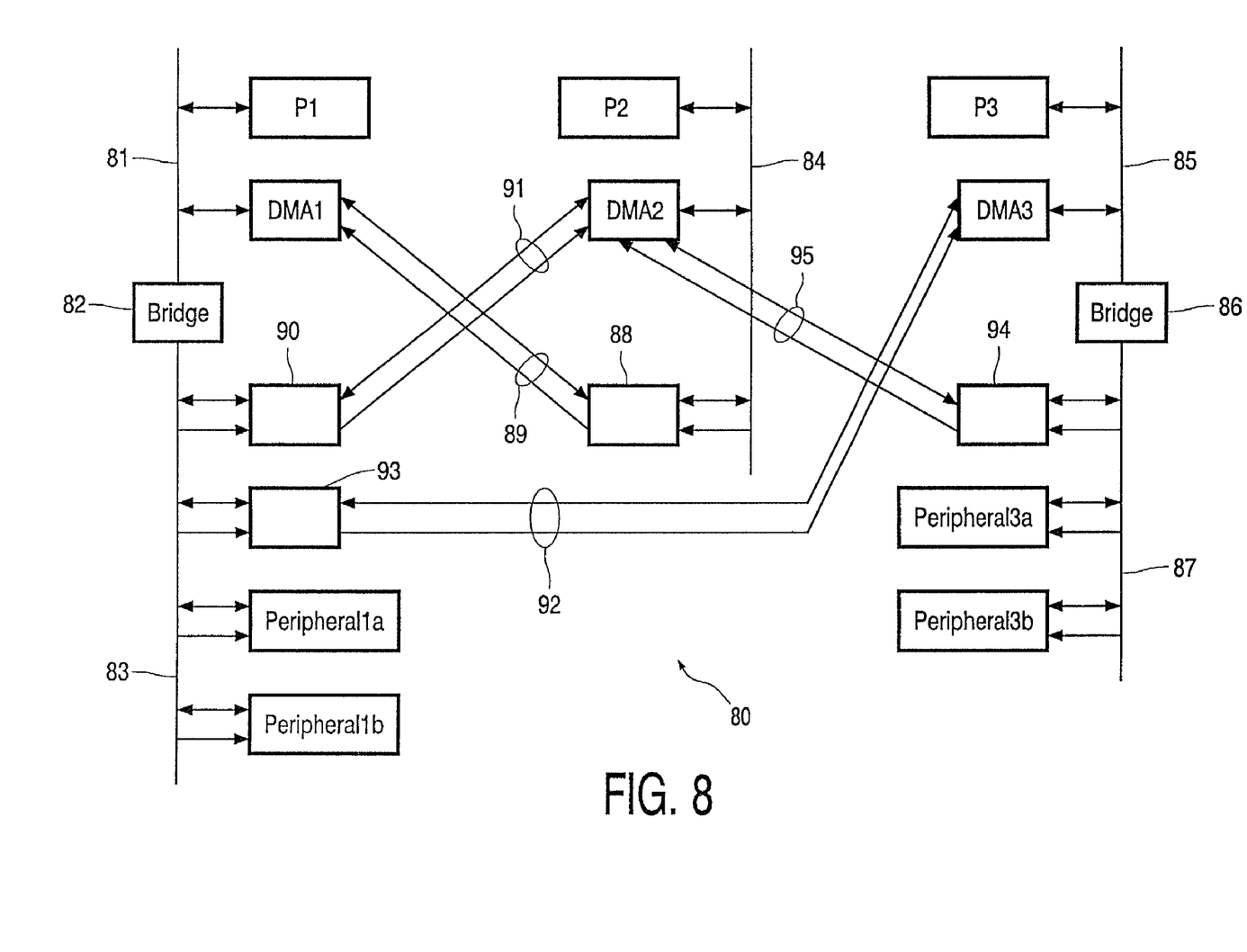
FIG. 8 is a block diagram of a computer system with three processors, according to another embodiment of the present invention.

FIG. 8 is a block diagram of a computer system 80 including three processors P1, P2, and P3, according to another embodiment of the present invention. The first processor P1 is connected to a DMA 1 via a fast processor bus 81. A bridge 82 is employed to link the processor bus 81 to a slow peripheral bus 83 with several peripherals 1a and 1b. These elements are all part of the first processor environment. The second processor P2 and the fast processor bus 84 are part of the second processor environment. Processor P3 is linked via a fast processor bus 85 and a bridge 86 to a slow peripheral bus 87. In the present embodiment, there are two peripherals 3a and 3b coupled to this peripheral bus 87. According to the present invention physical half-duplex channels are established between the three processors P1, P2, P3 as illustrated in FIG. 8. An access unit 88 comprising a DAU core and an external DMA channel interface is employed to establish a connection 89 between the processor bus 84 and the DMA1 of the first processor P1. There is also an access unit 90 comprising a DAU core and an external DMA channel interface within the first processor environment. This access unit 90 is employed to establish a connection 91 to the DMA2 of the second processor environment. The arrangement of the access unit 88 and the DMA1 on one side and the access unit 90 and the DMA2 on the other side is symmetric, as illustrated in FIG. 8. In the present embodiment there is also a connection 92 between the first processor environment and the third processor environment. This connection 92 is established between the access unit 93 on the left hand side and the DMA3 on the right hand side. Last but not least, there is also a connection 95 for interconnecting the second and third processor environments. This connection 95 links the access unit 94 to the DMA2. The access units 90, 93, 94 are located in the slow peripheral buses 83, 87 and connect as external channels 91, 92, 95 to the DMA unit DMA2, DMA3 of another processor. This provides a highly symmetrical intercore solution. The access units 90, 93, and 94 make use of the external DMA channels to transfer date in/from remote peripherals.

Figure 9:
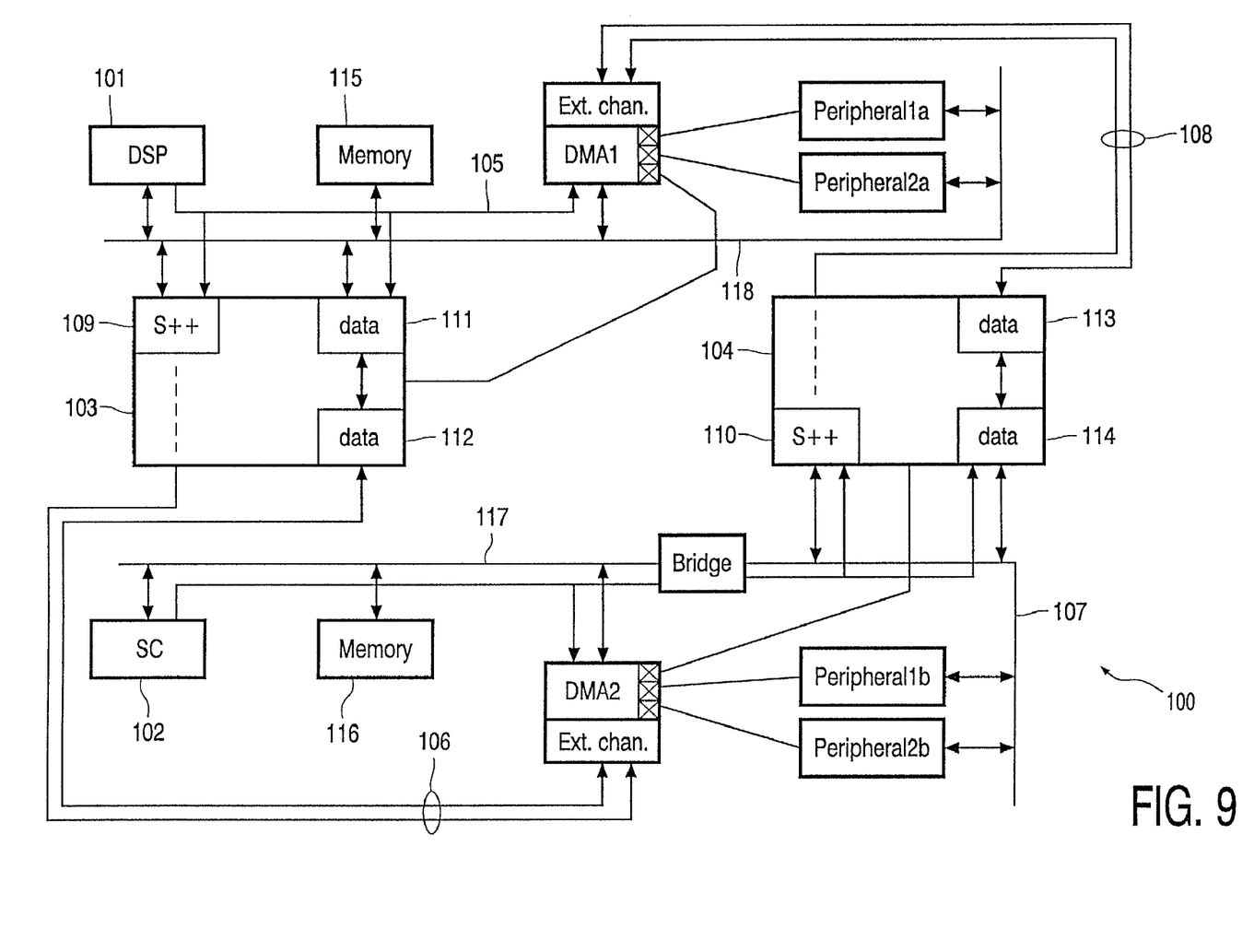
FIG. 9 is a block diagram of yet another embodiment of a computer system with two processors according to the present invention.

Yet another embodiment 100 is presented in FIG. 9. This embodiment 100 features two physical half-duplex channels between a digital signal processor (DSP) core 101 and a system controller (SC) core 102. There is an access unit 103 connected to the Input/Output bus 105 in the DSP input/output space. Two peripherals (peripheral 1a and peripheral 2a) are connected to the peripheral bus 118. This access unit 103 connects as an external channel 106 to a DMA2 within the environment of the SC 102. An access unit 104 is situated in the SC input/output space where it connects to a peripheral bus 107. Two peripherals (peripheral 1b and peripheral 2a) are connected to the peripheral bus 107. This access unit 104 connects as an external channel 108 to a DMA1 within the environment of the DSP 101. In the present embodiment, each access unit 103, 104 features a 32-bit address register (s++) 109, 110 with auto-increment functionality and 16-bit data registers 111, 112, 113, 114.

Direct access by a core to the far memory space 115, 116 can take place in an indirect addressing way, i.e., the address is written to the address register 109, 110 before data can be transferred via the data registers 111, 112, 113, 114. If the auto-increment function is enabled, further access to the subsequent addresses can be done without the explicit setting of the respective address register. This minimizes the overhead for block transfers and allows the use of DMA without having to apply an address.

In case of competitive usage of the access units by a DAU core and a DMA, two auto-increment address registers can be provided to allow quasi-parallel operation.

Direct access might lead to a high latency on the DSP 101 side if the SC bus 117 is occupied by the SC core 102 for a longer period. For transfers of larger blocks of data during busy moments, this can be improved by changing the arbitration mode on the SC bus 117.

It is also possible to implement a block transfer mode. In this mode, the access unit may be configured to transfer a larger block of data using both DMAs.

A mailbox functionality may also be implemented. A transfer is for instance initiated by the SC 102. Upon completion of a transfer, an interrupt is generated at the DSP 101. The DSP 101 can request a new data transfer by generation of an interrupt at the SC 102. To allow quasi parallel use of the block transfer and mailbox functionality, two auto-increment address registers may be implemented.

According to another embodiment, a common, shared mailbox unit is employed for messaging purposes; the processors of the multi-processor system can all access this mailbox unit.

In yet another embodiment of the invention, two or more processors and a communication channel for inter-processor communication in accordance with the present invention, are integrated into a custom application specific integrated circuit (ASIC).

It is an advantage of the architecture presented and claimed herein that it supports multiple heterogeneous processors. The inventive scheme can be expanded to suit general multi-core communication needs. According to the present invention, the number of bus masters for each processor can be reduced as potentially available DMA units can be used for this purpose. The concept and design re-use is another advantage. Various other advantages have been mentioned in connection with the various embodiments of the present invention.

The fact that certain devices are enabled by the DMA to directly access memory helps to speed up the process.

The proposed architecture is symmetric and applicable to most microprocessor architectures. It can be expanded to multi-core architectures, i.e., it is independent of the number of cores.

The present invention is well suited for use in computing devices, such as PDAs, handheld computers, palm top computers, and so forth. It is also suited for use in cellular phones (e.g., GSM phones), cordless phones (e.g., DECT phones), and so forth. The architecture proposed herein can be used in chips or chip sets for the above devices or chips for Bluetooth applications.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable subcombination.

The drawings and specification disclose preferred embodiments of the invention and, although specific terms are used, the description thus given uses terminology in a generic and descriptive sense only and not for purposes of limitation.

The invention claimed is:

1. A system (15) comprising two integrated processors (P1, P2) operably connected via a communication channel (17) for exchanging information, wherein
one processor (P1) has
a first clock signal.
a processor bus (10),
a DMA unit (11) with an external DMA channel (12), the DMA unit (11) being connected to the processor bus (10),
a shareable unit (13) being connected to the processor bus (10),
the other processor (P2) has
a second clock signal, and
an access unit (21) for exchanging the information via the external DMA channel (12), the access unit including: a processor interface for exchanging the information at a data flow corresponding to the second clock signal; a direct access unit (DAU) core; and an external DMA channel interface for exchanging the information at a data flow corresponding to the first clock signal;
wherein the communication channel (17) can be established from the access unit (21) to the shareable unit (13) via the external DMA channel (12), the DMA unit (11), and the processor bus (10).

2. A system as claimed in claim 1, wherein the processor (P1) and the processor (22) are similar from an architectural point of view.

3. A system as claimed in claim 1, wherein the processor (P1) and the processor (P2) are implementations of the same type of processor design.

4. A system as claimed in claim 1, wherein the processor (P1) and the processor (P2) are implementations of different types of processor design.

5. A system as claimed in claim 1, wherein the shareable unit (13) is either of the following: a memory, or a peripheral, or an interface, or an input device, or an output device.

6. A system as claimed in claim 1, wherein one or both of the two integrated processors (P1, P2) is a central processing unit (CPU), or a microprocessor, or a digital signal processor (DSP), or a system controller (SC), or a co-processor, or an auxiliary processor.

7. A system as claimed in claim 1, wherein the DMA unit (11) has one or more dedicated internal DMA channels.

8. A system as claimed in claim 1, wherein the access unit (21) comprises a processor interface (32), a direct access unit core (31), and an external DMA channel interface (30).

9. A system as claimed in claim 8, wherein the processor interface (32) has a data link (33) and a control link (34) for connection to a processor bus (20) of the other processor (P2).

10. A system as claimed in claim 1, wherein the communication channel (17) is a half duplex channel.

11. A system as claimed in claim 1, wherein the communication channel (17) is employed for transferring data and/or control information to and from the shareable unit (13).

12. A computing device comprising two processors (P1, P2) which are arranged on a common semiconductor die and are operably connected via a communication channel (17) for exchanging information, wherein
one processor (P1) has
a first clock signal,
a processor bus (10),
a DMA unit (11) with an external DMA channel (12), the DMA unit (11) being connected to the processor bus (10),
a shareable unit (13) being connected to the processor bus (10),
the other processor (P2) has
a second clock signal, and
an access unit (21) for exchanging the information via the external DMA channel (12), the access unit including: a processor interface for exchanging the information at a data flow corresponding to the second clock signal; a direct access unit (DAU) core; and an external DMA channel interface for exchanging the information at a data flow corresponding to the first clock signal;
wherein the communication channel (17) can be established from the access unit (21) to the shareable unit (13) via the external DMA channel (12), the DMA unit (11), and the processor bus (10).

13. A computing device as claimed in claim 12 being part of a PDA, a handheld computer, a palm top computer, a cellular phone, or a cordless phone.

14. A computing device as claimed in claim 12, wherein the processors are heterogeneous processors.

15. A computing device as claimed in claim 12, wherein the processors are homogeneous devices.

16. A system as claimed in claim 1, wherein the processors are heterogeneous processors.

17. A system as recited in claim 1, wherein the processors are homogeneous devices.

18. A computing device as claimed in claim 12, wherein the shareable unit is either of the following: a memory, or a peripheral, or an interface, or an input device, or an output device.

19. A computing device as claimed in claim 12, wherein one or both of the two processors is a central processing unit (CPU), or a microprocessor, or a digital signal processor (DSP), or a system controller (SC), or a co-processor, or an auxiliary processor.

20. A computing device as claimed in claim 12, wherein the communication channel (17) is a half-duplex channel adapted to transfer data, or control information, or both, to and from the shareable unit (13).

* * * * *